(12) United States Patent
Yu et al.

(10) Patent No.: US 7,728,818 B2
(45) Date of Patent: Jun. 1, 2010

(54) METHOD, DEVICE COMPUTER PROGRAM AND GRAPHICAL USER INTERFACE FOR USER INPUT OF AN ELECTRONIC DEVICE

(75) Inventors: Kun Yu, Beijing (CN); Kong Qiao Wang, Beijing (CN); Jari Kangas, Tampere (FI)

(73) Assignee: Nokia Corporation, Espoo (FI)

( * ) Notice: Subject to any disclaimer, the term of this patent is extended or adjusted under 35 U.S.C. 154(b) by 1230 days.

(21) Appl. No.: 11/240,918

(22) Filed: Sep. 30, 2005

(65) Prior Publication Data

US 2007/0075976 A1 Apr. 5, 2007

(51) Int. Cl.
*G09G 5/00* (2006.01)

(52) U.S. Cl. .................. 345/172; 345/156; 345/173; 345/174; 345/175; 345/176; 345/178; 345/179; 715/700; 715/773; 715/775; 715/810; 715/863; 715/866; 382/188

(58) Field of Classification Search .................. 345/156, 345/172–179, 159; 715/700, 773, 863, 864; 382/188
See application file for complete search history.

(56) References Cited

U.S. PATENT DOCUMENTS

| 5,760,773 | A | 6/1998 | Berman et al. | |
|---|---|---|---|---|
| 5,966,122 | A | 10/1999 | Itoh | |
| 6,618,040 | B1* | 9/2003 | Mattaway et al. | 345/173 |
| 2003/0107607 | A1 | 6/2003 | Nguyen | |
| 2004/0001073 | A1 | 1/2004 | Chipchase | 345/619 |
| 2004/0119763 | A1* | 6/2004 | Mizobuchi et al. | 345/863 |
| 2005/0140661 | A1* | 6/2005 | Collins | 345/173 |

* cited by examiner

*Primary Examiner*—Richard Hjerpe
*Assistant Examiner*—Saifeldin Elnafia
(74) *Attorney, Agent, or Firm*—Harrington & Smith

(57) ABSTRACT

A method of controlling an electronic device including a touch sensitive display the method including displaying a plurality of graphical items on the touch sensitive display where each graphical item has an identity; detecting a coupling, formed by a user, of at least two graphical items, the coupling including, a trace on the touch sensitive display between the at least two graphical items; and, performing an action dependent upon the identity of the coupled graphical items.

32 Claims, 6 Drawing Sheets

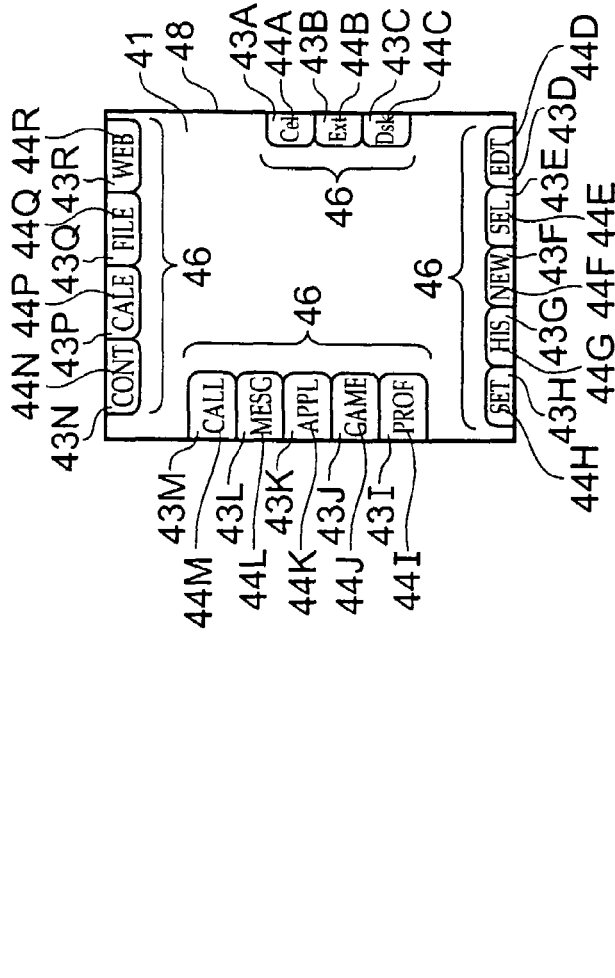
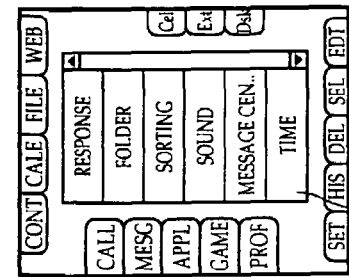
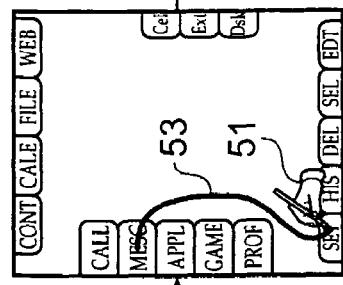
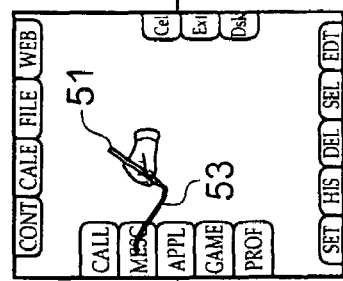
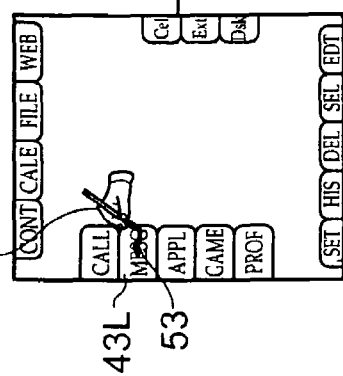

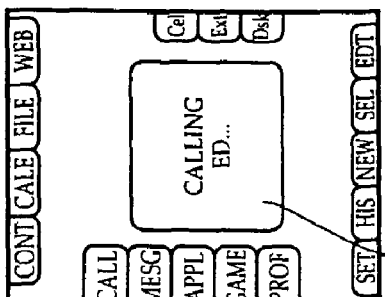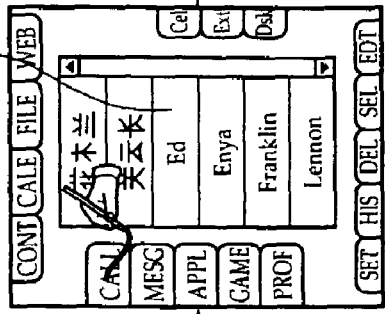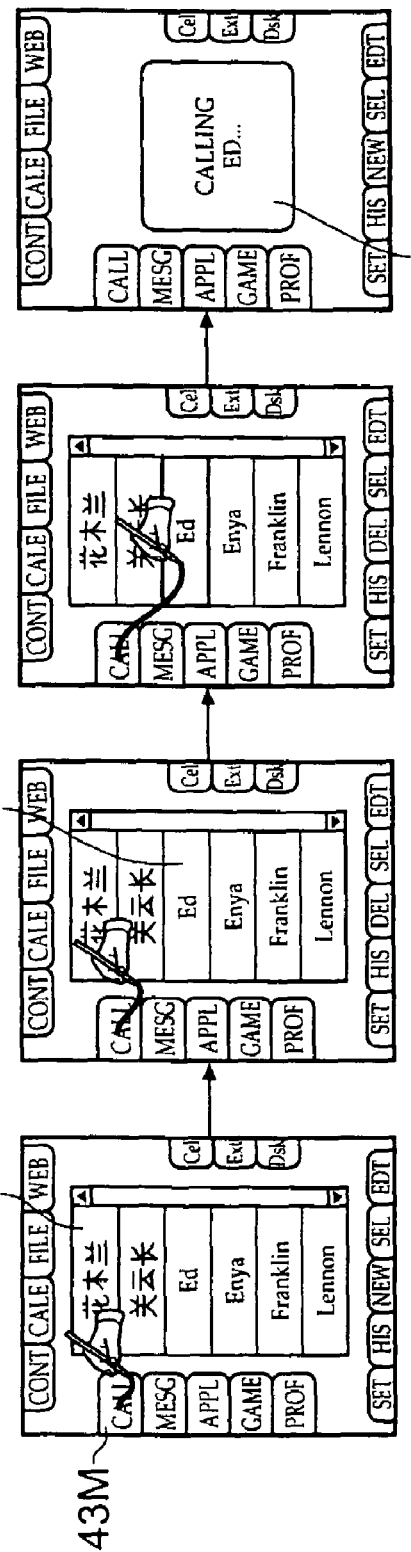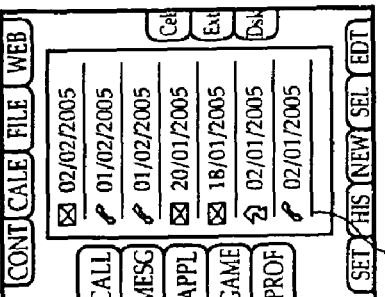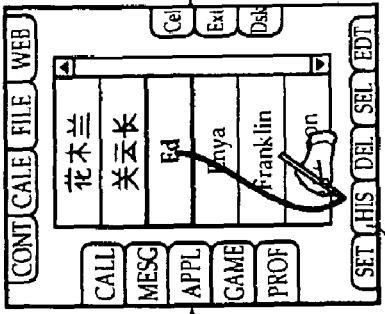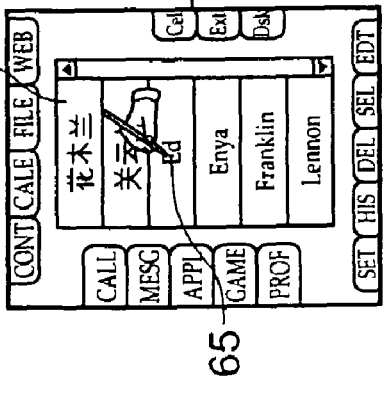

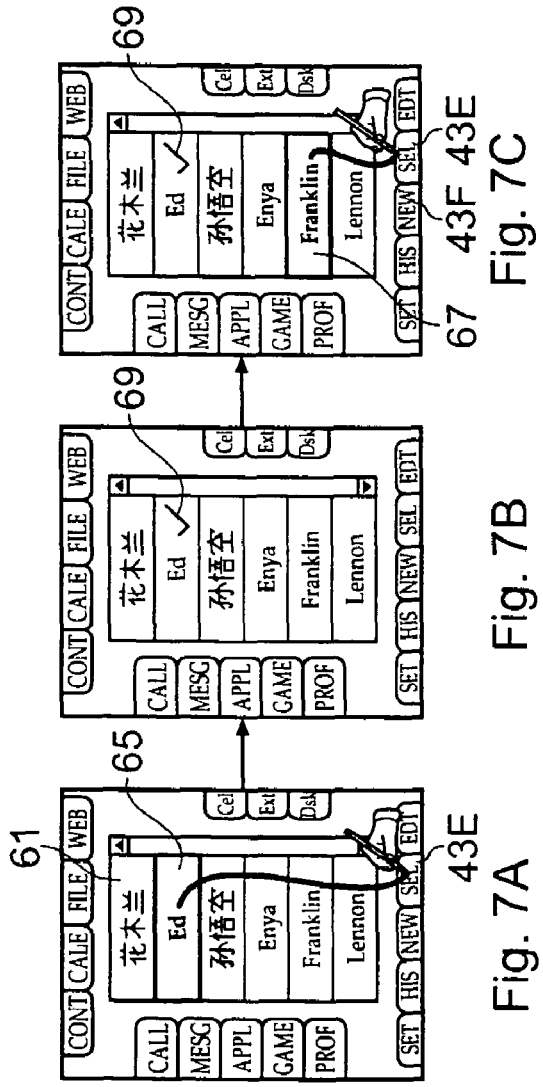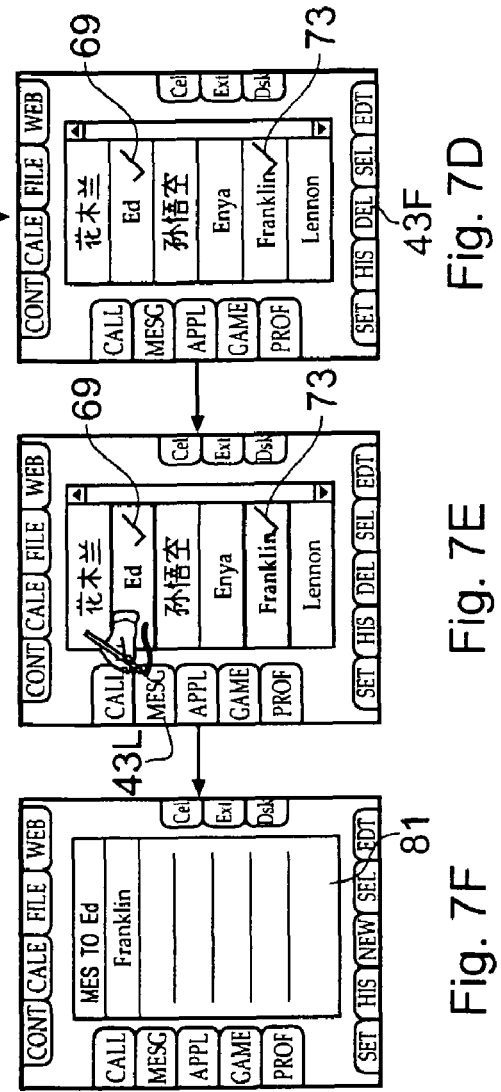

METHOD, DEVICE COMPUTER PROGRAM AND GRAPHICAL USER INTERFACE FOR USER INPUT OF AN ELECTRONIC DEVICE

FIELD OF THE INVENTION

Embodiments of the present invention relate to a method, device, computer program and graphical user interface for user input of an electronic device. In particular they relate to a method, device, computer program and graphical user interface for user input of a device having a touch sensitive display.

BACKGROUND TO THE INVENTION

Traditionally a user of an electronic device, such as a mobile telephone, can use a key pad to control the device. This can often be an inconvenient and inefficient method of operating an electronic device. The options available to a user are often arranged in a hierarchical menu structure and it may take several key presses before the user is able to select or enable their chosen function.

Many electronic devices now comprise touch sensitive displays. It would be beneficial if such displays could be used to provide an improved user interface to a user which allows a user to quickly and easily access and enable the functions available.

BRIEF DESCRIPTION OF THE INVENTION

According to one embodiment of the invention there is provided a method of controlling an electronic device comprising a touch sensitive display the method comprising: displaying a plurality of graphical items on the touch sensitive display where each graphical item has an identity; detecting a coupling, formed by a user, of at least two graphical items, the coupling comprising, a trace on the touch sensitive display between the at least two graphical items; and, performing an action dependent upon the identity of the coupled graphical items.

The invention provides the advantage that a user can easily control the device to perform an action by coupling any pair of graphical items displayed on the touch sensitive display. Only one input is required by the user.

Also, as a plurality of graphical items can be displayed on the user interface at any one time the user can easily view the available functions without having to scroll through menu options.

The identity of each graphical item may be associated with a function of the device and/or information stored in the device.

According to another embodiment of the invention there is provided an electronic device comprising: a touch sensitive display for displaying a plurality of graphical items; detection means for detecting user input on the touch sensitive display; and control means for controlling the touch sensitive display; wherein each graphical item has an identity and the control means is arranged, in response to detection, by the detection means, of a coupling formed by a user between the at least two graphical items comprising a trace on the touch sensitive display between the at least two graphical items, to control the device to perform an action dependent on the identity of the coupled graphical items.

According to another embodiment of the invention there is provided a computer program comprising program instructions for controlling an electronic device comprising a touch sensitive display which, when loaded into a processor, comprises: means for controlling the display to display a plurality of graphical items on the touch sensitive display where each graphical item has an identity; detecting a coupling, formed by a user, of at least two graphical items, the coupling comprising a trace on the touch sensitive screen between the at least two graphical items; and controlling the device to perform an action dependent upon the identity of the coupled graphical items.

According to another embodiment of the invention there is provided a graphical user interface that: displays a plurality of graphical items on the touch sensitive display where each graphical item has an identity; enables the coupling of at least two graphical items by a user making a trace between the at least two graphical items; and, in response to detecting the coupling of the at least two graphical items enables performance of an action of the device wherein the action performed depends on the identity of the at least two graphical items.

According to another embodiment of the invention there is provided a method of controlling an electronic device using a touch sensitive display the method comprising: displaying a plurality of graphical items on the touch sensitive display where each graphical item has an identity; detecting a coupling, formed by a user, of two graphical items comprising a trace on the touch sensitive display between the two graphical items; performing a first action of the device, in response to the detection of the coupling of a first graphical item to a second graphical item; and performing a second action of the device, in response to the detection of the coupling of the first graphical item to a third graphical item.

BRIEF DESCRIPTION OF THE DRAWINGS

For a better understanding of the present invention reference will now be made by way of example only to the accompanying drawings in which:

FIG. 3 illustrates a graphical user interface according to an embodiment the present invention; and FIGS. 4 to 9 illustrate an embodiment of the present invention in use.

DETAILED DESCRIPTION OF EMBODIMENTS OF THE INVENTION

Figure 1:
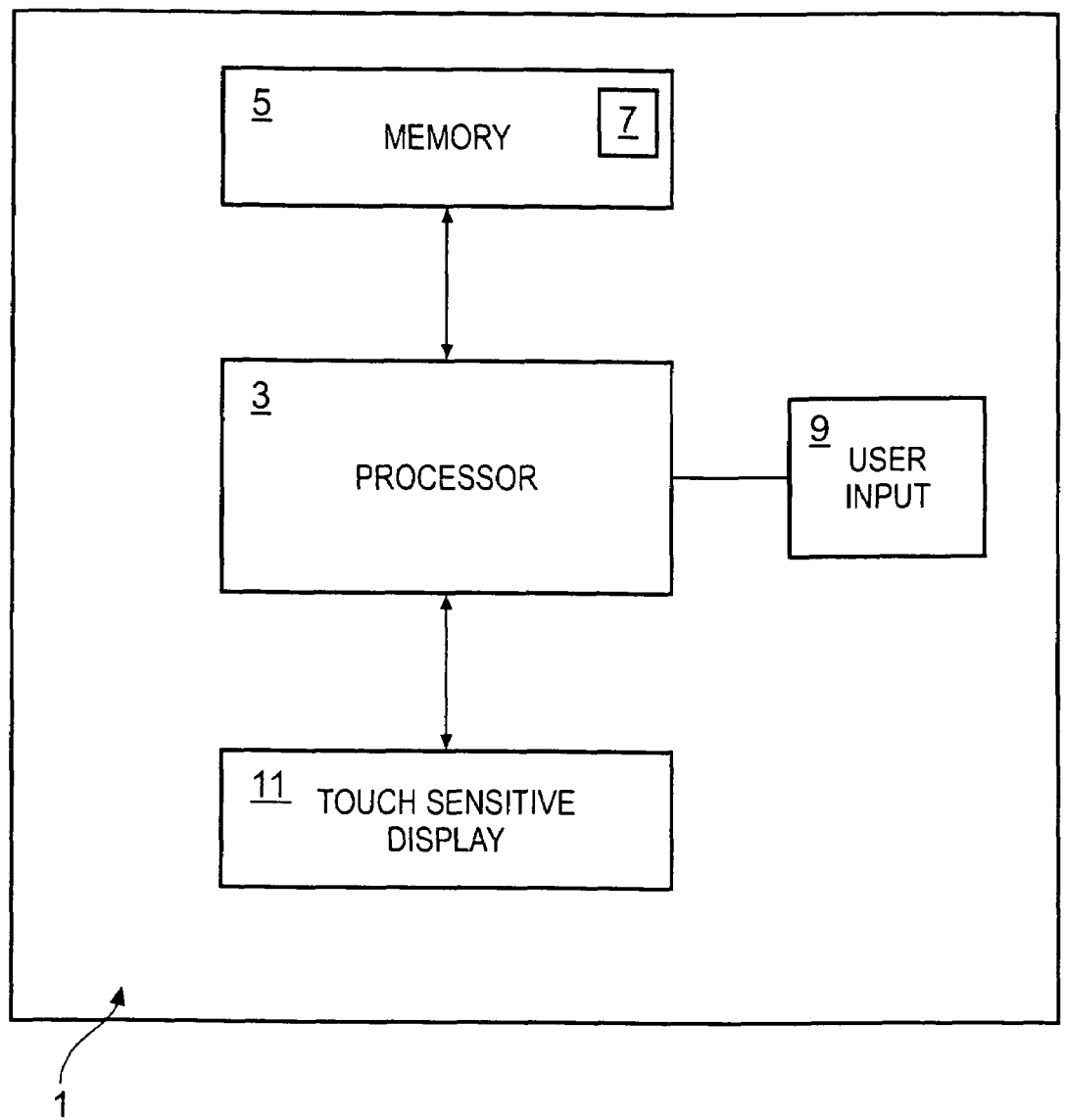
FIG. 1 schematically illustrates an electronic device.

The Figures illustrate a method of controlling an electronic device 1 comprising a touch sensitive display 11 the method comprising: displaying a plurality of graphical items 43 on the touch sensitive display 11 where each graphical item 43 has an identity; detecting a coupling, formed by a user, of at least two graphical items 43, the coupling comprising, a trace on the touch sensitive display 11 between the at least two graphical items 43; and, performing an action dependent upon the identity 44 of the coupled graphical items 43.

FIG. 1 schematically illustrates an electronic device 1. Only the features referred to in the following description are illustrated. It should, however, be understood that the device 1 may comprise additional features that are not illustrated. The electronic device 1 may be, for example, a personal computer, a personal digital assistant, a mobile cellular telephone, a television, a video recorder in combination with a television, or any other electronic device that uses a graphical user interface.

The illustrated electronic device 1 comprises: a user input 9, a memory 5, a touch sensitive display 11 and a processor 3. The processor 3 is connected to receive input commands from the user input 9 and to provide output commands to the display 11. The processor 3 is also connected to write to and read from the memory 5.

The touch sensitive display 11 presents a graphical user interface (GUI) to a user. An example of a GUI according to an embodiment of the invention is illustrated in FIG. 3.

The memory 5 stores computer program instructions 7, which when loaded into the processor 3, enable the processor 3 to control the operation of the device 1 as described below. The computer program instructions 7 provide the logic and routines that enables the electronic device 1 to perform the method illustrated in FIG. 2.

The computer program instructions 7 may arrive at the electronic device 1 via an electromagnetic carrier signal or be copied from a physical entity such as a computer program product, a memory device or a record medium such as a CD-ROM or DVD.

Figure 2:
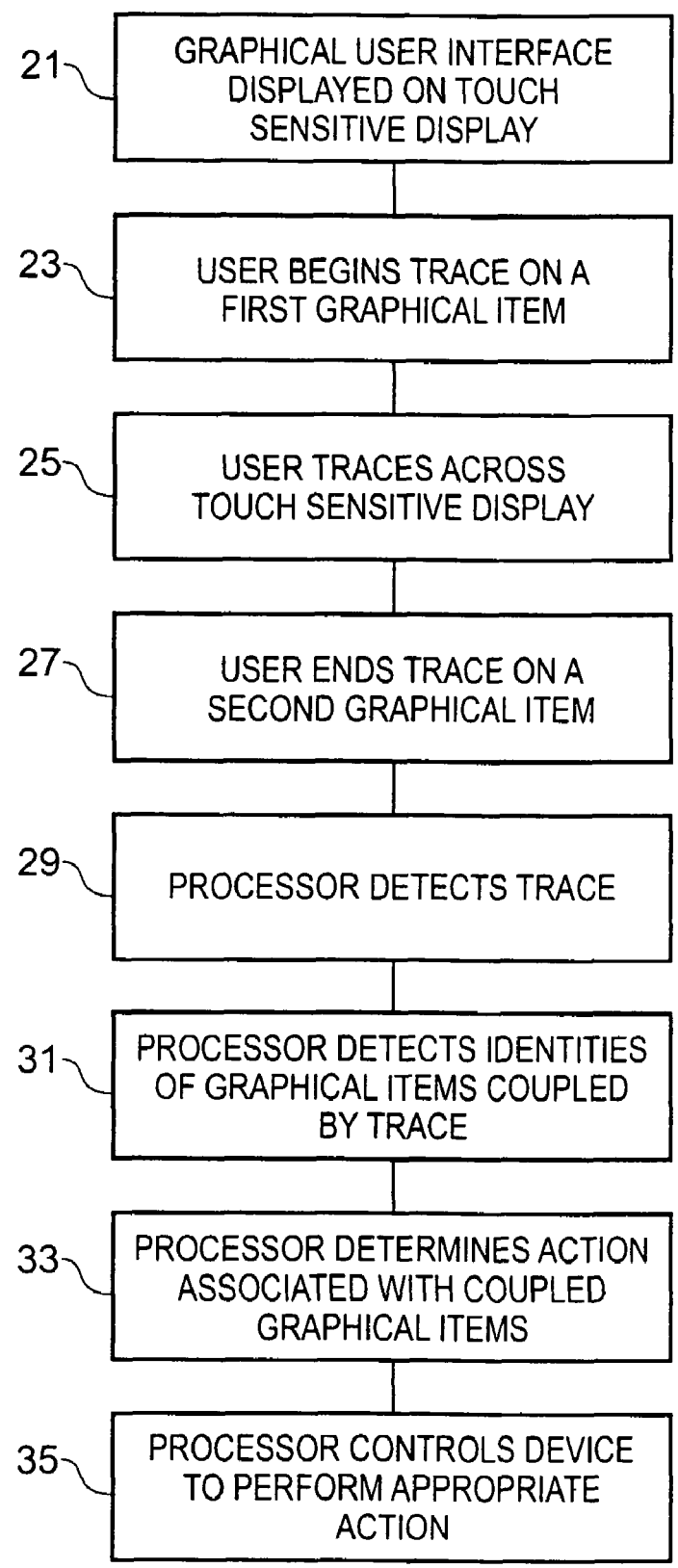
FIG. 2. illustrates a flow chart showing method steps of an embodiment of the present invention.

A method of controlling the device 1, according to the present invention, is illustrated schematically in FIG. 2.

The method starts at step 21 where the processor 3 controls the display to present a graphical user interface to a user. An example of a graphical user interface 41 according to one embodiment of the present invention is illustrated in FIG. 3.

In FIG. 3 the graphical items 43 are arranged around the edge 48 of the GUI 41. Each graphical item 43 has a label 44 indicative of its identity. The identity is associated with an action of the device and/or information stored in the device.

The GUI 41 and the graphical items 43 illustrated in FIG. 3. are suitable for use with a cellular mobile telephone. Different GUIs and graphical items could be used for different devices.

Preferably the graphical items 43 are arranged in an order which is convenient and intuitive for a user to use. In the embodiment shown the graphical items 43 are arranged in different groups 46 so that similar actions and information are grouped together. In this specific embodiment graphical items 43 cannot be coupled to other graphical items 43 in the same group 46.

The graphical items 43 may be different sizes. In some embodiments the graphical items 43 which are used most often may be larger than the other graphical items 43. The user may be able to change the size of the graphical items 43.

Returning to FIG. 2 steps 23 to 27 schematically illustrate a method of coupling two graphical items 43 together by making a trace across the touch sensitive display. At step 23 the user begins the trace by touching the touch sensitive display 11 where a first originating graphical item 43 is being displayed. The user may touch the display 11 with a pen, stylus, their finger or the like.

At step 25 the user makes a trace across the screen by keeping the pen or stylus in contact with the display 11 while they move the pen or stylus across the display 11 to a destination second graphical item. At step 27, when the pen or stylus is above the destination second graphical item, the user lifts the pen from the display 11, this terminates the trace and completes the coupling of the first and second graphical items.

The processor 3 detects, at step 29, that a trace has been made and then detects, at step 31, the identities 44 of the graphical items 43 which have been coupled together. The identities 44 of the graphical items 43 may be the labels of the graphical items 43 or a code associated with those labels.

At step 33 the processor 3 determines the action which is associated with the identities of the graphical items which have been coupled together. This may be done by referencing a look up table stored in the memory 5 which lists all possible couplings of identities and the actions, if any, associated with them. For instance the look up table could list that the coupling of identity A with identity B is associated with the action X and that the coupling of identity A with identity C is associated with the action Y.

As an example identity A could be messages, identity B could be a name and identity C could be settings. The look up table would then indicate that coupling A with B causes a message to be sent to the name B whereas coupling A with C enables a user to access the message settings of the device.

At step 35 the processor 3 controls the device 1 to perform the action corresponding to the identities of the graphical items 43 that have been coupled together.

FIG. 4 illustrates a user using the GUI 41 illustrated in FIG. 3. In this example, the user begins the trace as illustrated in FIG. 4A on graphical item 43L by touching the display with the stylus 51. The graphical item 43L is associated with the message function and message information of the device. In FIG. 4B the user extends the trace 53 by dragging a pen or stylus 51 across the touch sensitive display 11. In this embodiment the dragging action leaves a visible trace on the display 11. In other embodiments the dragging action may not leave a visible trace.

The user ends the trace 53 and couples the graphical items, as shown in FIG. 4C by lifting the pen or stylus from the display above the graphical item 43H associated with settings. The processor 3 detects that the message graphical item 43 has been coupled to the settings graphical items 43H and controls the device 1 to display a list 55 of the message settings options on the touch sensitive display as illustrated in 4D.

In the embodiments shown when a trace is being made the graphical items 43 are stationary.

Preferably when the user begins to make a trace the graphical item 43 on which the trace began is highlighted. In the embodiments shown, there are some pairs of graphical items 43 which, if coupled together, do not have an action associated with them. Therefore in some embodiments once a trace has begun on one graphical item 43 all other graphical items 43 which cannot be coupled to it to produce an action change appearance, e.g. colour to indicate to a user which couplings of graphical items 43 are feasible.

In the example shown in FIG. 4 the user began the trace on the "message" graphical item 43L and ended on the "settings" graphical item 43H to control the device 1 to display the list of message settings 55. In this embodiment the same action would have been produced had the user begun the trace on the 'settings' graphical item 43H and ended on the 'message' graphical item 43L. That is, in this embodiment the order in which the graphical items 43 are coupled together is irrelevant it is only the identities of the graphical items 43 which determine the action performed. In other embodiments the action performed may be dependent on the order in which the graphical items 43 are coupled together.

FIG. 5. illustrates a user using the GUI 41 presented by the display 11 to dial a telephone number stored in the memory 5 of the device 1. FIG. 5A illustrates a contacts list 61 displayed on the touch sensitive display 11. The contact list 61 may be displayed in response to the user coupling the "contacts" graphical item 43N to the "select" graphical item 43E. Each of the names in the contact list 61 is a graphical item and is associated with information such as a telephone number or other contact details. The graphical items in the contact list 61 can be coupled to the graphical items 43 around the edge of the GUI 41 so that actions can be performed on the contact information.

To dial a number the user begins a trace on the graphical item associated with the call function 43M as shown in FIG.

5A. FIG. 5B illustrates the user making a trace, in a similar manner to the previous example illustrated in FIG. 4, by dragging the stylus across the display 11. FIG. 5C illustrates the user ending a trace on the graphical item 65 corresponding to the name Ed. The graphical item 65 becomes highlighted while the trace is overlying the graphical item.

The processor 3 detects that the "call" graphical item 43M has been coupled to the 'Ed' graphical item 65 and controls the device to dial the number associated with the name Ed as illustrated in FIG. 5D.

The user could also dial a number by starting a trace on the name graphical item and ending on the "call" graphical item 43M. In this embodiment, the order in which the graphical items are coupled together does not affect the functions performed.

FIG. 6 illustrates a user using the GUI 41 to view the contact history associated with one of the contacts in the contact list 61. In FIG. 6A the user begins the trace on graphical item 65 associated with the name Ed from the list 61. The user couples the graphical item 65 to the "history" graphical item 43G as illustrated in FIGS. 6B and 6C. The processor 3 then controls the device 1 to display the contact history 71 for Ed on the display 11 as illustrated in FIG. 6D.

FIGS. 5 and 6 show the graphical item 65 corresponding to the name Ed being coupled to two different graphical items. The action performed on the information associated with the name Ed is dependent upon the graphical item 43 which it is coupled to.

FIG. 7 illustrates a user using the GUI 41 to create a message. FIG. 7A illustrates a user selecting the name Ed by coupling the graphical item 65 associated with the name Ed to the "select" graphical item 43E. The processor 3 then controls the display to make a visual indication to the user that the name has been selected. In the embodiment shown in FIG. 7B this visual indicator is a tick 69 next to the selected name, in other embodiments the graphical item associated with the selected name could be highlighted e.g. displayed in a different colour.

FIG. 7C illustrates a user selecting a second name from the contact list 61 by coupling the graphical item 67 associated with the name Franklin to the select graphical item 43E. The processor 3 then controls the display so that the name Franklin also has a tick 73 next to it to indicate that it has also been selected as illustrated in FIG. 7D.

The user creates a message 81, to go to all selected names, by coupling any one of the selected names to the 'message' graphical icon 43L as illustrated in FIG. 7E. In the embodiment shown when the user begins to make a trace from one of the selected names all other selected names become highlighted.

In the embodiments illustrated, the identities of the graphical items can change depending on the mode of the device. For example, the "new" graphical item 43F becomes the "delete" graphical item when more than one name is selected as illustrated in FIG. 7F. This is to allow a user to de-select one of the selected names.

In the example shown in FIG. 7 coupling a name graphical item 65 to the 'message' graphical item 43L causes an action, in this case creating a message, to be performed on the information associated with the name graphical item 65. In the example illustrated in FIG. 4 coupling the 'message' graphical item 43M to the 'settings' graphical item 43H causes an action, displaying the settings, to be performed on the information associated with the 'message' graphical item 43M. That is a single graphical item 43 can represent the information on which an action is to be performed or the action itself depending upon context i.e. which graphical item is coupled to it. The action is dependent on the identity of the graphical item to which the graphical item is coupled.

Figures 8A, 8B:
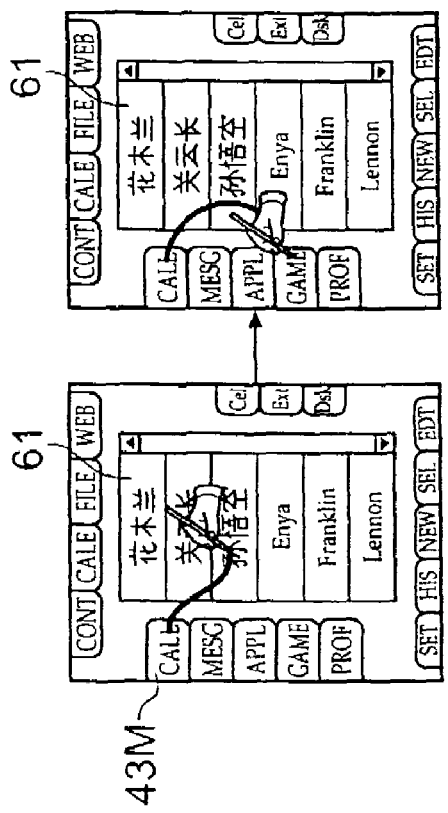

FIG. 8 illustrates one embodiment of how a user can cancel a trace if, for example, they inadvertently begin a trace on the wrong graphical item 43 or they change their mind about which action they wish to perform. FIG. 8A illustrates a user beginning a trace on the 'call' graphical item 43M. FIG. 8B illustrates the user canceling the trace by ending it on one of the graphical items which are in the same group 46 as the 'call' graphical item 43M. As graphical items 43M are arranged in groups 46 such that none of the items can be coupled together this causes the trace to cancelled.

Figures 9A, 9B, 9C:
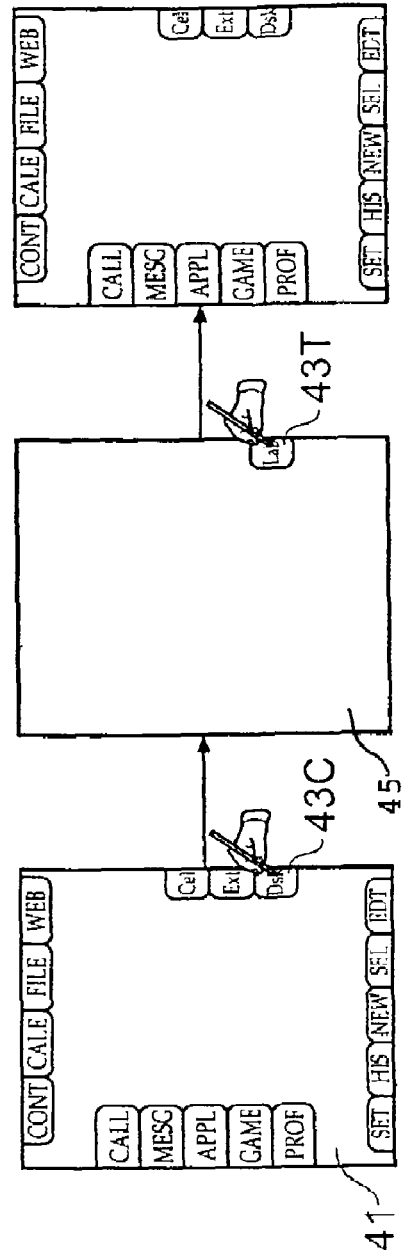

It may be undesirable to have the graphical items 43 displayed on the GUI 41 at all times. The desktop graphical item 43C may be used to hide all the other graphical items. This may be achieved by holding the pen or stylus over the desktop graphical item 43C for a predetermined length of time, as illustrated in FIG. 9A. This causes the device to replace the GUI 41 illustrated in FIG. 9C with the GUI 45 illustrated in FIG. 9B which only has one graphical item 43T. To return to the original GUI 41 the user holds the pen or stylus over label graphical item 43T.

Although embodiments of the present invention have been described in the preceding paragraphs with reference to various examples, it should be appreciated that modifications to the examples given can be made without departing from the scope of the invention as claimed.

The invention claimed is:

1. A method comprising:
   displaying a plurality of graphical items on a touch sensitive display where each graphical item has an identity;
   detecting a coupling, formed by a user, of at least two graphical items, the coupling comprising, a trace on the touch sensitive display between the at least two graphical items, wherein when the user begins to make the trace, an indication is displayed to indicate the item on which the trace began; and,
   performing an action dependent upon the identity of the coupled graphical items.

2. A method as claimed in claim 1 wherein coupling a first graphical item to a second graphical item causes the device to perform a first action.

3. A method as claimed in claim 2 wherein the first action is an action associated with the first graphical item and is performed on information associated with the second graphical item.

4. A method as claimed in claim 2 wherein coupling the first graphical item to a third graphical item causes the device to perform a second action.

5. A method as claimed in claim 4 wherein the second action is an action associated with the third graphical item and is performed on information associated with the first graphical item.

6. A method as claimed in claim 1 wherein the identity of each graphical item is associated with a function of the device and/or information stored in the device.

7. A method as claimed in claim 1 wherein the graphical items are stationary during the formation of the coupling.

8. A method as claimed in claim 1 wherein the trace between two graphical items can begin on either of the at least two graphical items.

9. A method as claimed in claim 1 wherein the identity of a graphical item may depend upon the mode of the device.

10. A method as claimed in claim 1 wherein the graphical items are arranged in groups of associated actions.

11. A method as claimed in claim 10 wherein the graphical items are arranged at the edge of the touch sensitive display.

12. A method as claimed in claim 11 wherein coupling a graphical item to any graphical item in the same group causes the trace to be cancelled.

13. A method as claimed in claim 1 wherein a pen or stylus is used to make traces across the touch sensitive display.

14. An apparatus comprising:
a touch sensitive display configured to display a plurality of graphical items;
a detector configured to detect user input on the touch sensitive display; and
a controller configured to control the touch sensitive display;
wherein each graphical item has an identity and the controller is arranged, in response to detection, by the detector, of a coupling formed by a user between the at least two graphical items comprising a trace on the touch sensitive display between the at least two graphical items, to control the apparatus to perform an action dependent on the identity of the coupled graphical items and the controller is also configured to control the display to display an indication, which indicates the item on which the trace began, when the user begins to make the trace.

15. An apparatus as claimed in claim 14 wherein coupling a first graphical item to a second graphical item causes the device to perform a first action.

16. An apparatus as claimed in claim 15 wherein the first action is an action associated with the first graphical item and is performed on information associated with the second graphical item.

17. An apparatus as claimed in claim 15 wherein coupling the first graphical item to a third graphical item causes the device to perform a second function.

18. An apparatus as claimed in claim 17 wherein the second action is an action associated with the third graphical item and is performed on information associated with the first graphical item.

19. An apparatus as claimed in claim 14 wherein the identity of each graphical item is associated with a function of the device and/or information stored in the device.

20. An apparatus as claimed in claim 14 wherein the graphical items are stationary during the formation of the coupling.

21. An apparatus as claimed in claim 14 wherein the trace between two graphical items can begin on either of the at least two graphical items.

22. An apparatus as claimed in claim 14 wherein the identity of a graphical item may depend upon the mode of the apparatus.

23. An apparatus as claimed in claim 14 wherein the graphical items are arranged in groups of associated actions.

24. An apparatus as claimed in claim 23 wherein the graphical items are arranged at the edge of the touch sensitive display.

25. An apparatus as claimed in claim 24 wherein coupling a graphical item to any graphical item in the same group causes the trace to be cancelled.

26. An apparatus as claimed in claim 14 wherein a pen or stylus is used to make traces across the touch sensitive display.

27. A computer program recorded on a computer readable medium, the computer program comprising program instructions for controlling an electronic device comprising a touch sensitive display which, when loaded into a processor, execution of the program instructions results in performing operations comprising:
controlling the display to display a plurality of graphical items on the touch sensitive display where each graphical item has an identity;
detecting a coupling, formed by a user, of at least two graphical items, the coupling comprising a trace on the touch sensitive screen between the at least two graphical items, wherein when the user begins to make the trace an indication is displayed to indicate the item on which the trace began; and
controlling the device to perform an action dependent upon the identity of the coupled graphical items, wherein the computer program is recorded on a computer readable medium.

28. A physical entity embodying the computer program as claimed in claim 27.

29. An electromagnetic carrier signal carrying the computer program as claimed in claim 27.

30. A computer program comprising program instructions for causing a computer to perform the method of claim 1.

31. A graphical user interface that:
displays a plurality of graphical items on the touch sensitive display where each graphical item has an identity;
enables the coupling of at least two graphical items by a user making a trace between the at least two graphical items; and, in response to detecting the coupling of the at least two graphical items
enables performance of an action of the device wherein the action performed depends on the identity of the at least two graphical items.

32. A method of controlling an electronic device using a touch sensitive display the method comprising:
displaying a plurality of graphical items on the touch sensitive display where each graphical item has an identity;
detecting a coupling, formed by a user, of two graphical items comprising a trace on the touch sensitive display between the two graphical items, wherein when the user begins to make the trace an indication is displayed to indicate the item on which the trace began;
performing a first action of the device, in response to the detection of the coupling of a first graphical item to a second graphical item; and
performing a second action of the device, in response to the detection of the coupling of the first graphical item to a third graphical item.

* * * * *